Figure 1:
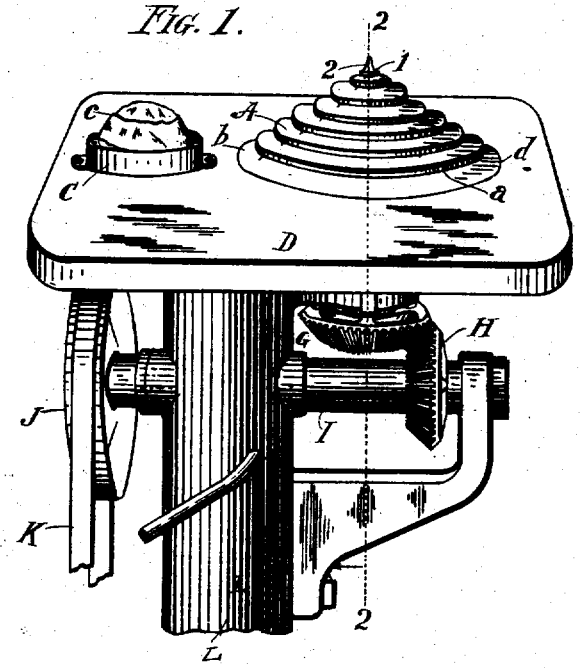

2 Sheets—Sheet 1.

F. E. FAY.

IRONING MACHINE FOR SMOOTHING EDGES OF CUFFS AND COLLARS.

No. 11,664. Reissued May 17, 1898.

Witnesses:
Ernest R. Ruth
A. S. Andrews.

Inventor.
Fred E. Fay.
by Knight Bros.
Attorneys.

THE NORRIS PETERS CO., PHOTO-LITHO., WASHINGTON, D. C.

F. E. FAY.

IRONING MACHINE FOR SMOOTHING EDGES OF CUFFS AND COLLARS.

No. 11,664. Reissued May 17, 1898.

Witnesses:
Ernest R. Guilk
A. Schulmus.

Inventor.
Fred E. Fay.
by Munn & Co
Attorneys.

THE NORRIS PETERS CO., PHOTO-LITHO., WASHINGTON, D. C.

UNITED STATES PATENT OFFICE.

FRED E. FAY, OF LOS ANGELES, CALIFORNIA.

IRONING-MACHINE FOR SMOOTHING EDGES OF CUFFS AND COLLARS.

SPECIFICATION forming part of Reissued Letters Patent No. 11,664, dated May 17, 1898.

Original No. 580,819, dated April 13, 1897. Application for reissue filed August 6, 1897. Serial No. 647,371.

*To all whom it may concern:*

Be it known that I, FRED E. FAY, a citizen of the United States, residing at Los Angeles, in the county of Los Angeles and State of California, have invented new and useful Improvements in Ironing-Machines for Smoothing the Edges of Cuffs and Collars, of which the following is a specification.

My invention relates to improvements upon those machines for ironing the edges of cuffs and collars in which a heated revolving cylindrical body is provided with peripheral grooves, in which the edge of the cuff or collar is to be inserted to smooth the same.

My invention relates to improvements by which to greatly increase the efficiency of the machine and the convenience and facility with which the work can be done, and also provide for the smoothing of the internal angles of the collar.

An object of my invention is to greatly increase the convenience and facility of adjusting the edge of the collar in the groove, thus to increase the rapidity with which the work can be done. In this relation my invention comprises an ironing-machine in which the rotating head has a peripheral groove the lower wall of which is wider than the upper wall and projects to form a stop, rest, and guide for catching the cuff or collar and guiding the edge thereof into the groove.

The improved rotating smoothing-head which I have invented is conical and stepped upon its upper face and has around each of the steps a peripheral groove the lower wall of which is on a line with the next lower step, and the gas-burner or other suitable means for heating the head is applied beneath the head. By this arrangement of the gas-burner the operator is given perfectly free access to all parts of the top of the head.

In my machine the under side of the head is provided with an annular groove, into which the flame from the gas-burner is projected.

Another distinguishing feature of my invention is that the whole top or upper surface of the circular rotary head is utilized for operating on the cuff or collar. It terminates at the top in a small button or knob having a small neck or spindle which will approximately fit into the internal angles of a collar, thus to smooth the edges of same, and I thereby provide for smoothing all parts of the edges of collars and cuffs.

By preference the rotating head is cone-shaped and is provided with a number of steps, each of which is provided with a peripheral groove the lower wall of which is on a line with the next lower step. By this means I provide for subjecting the edges of the cuff or collar to the action of various heated surfaces, respectively more or less sharply curved, thereby to more readily smooth edges which differ from each other in the degree of roughness—that is to say, one collar to be smoothed may be but slightly rough along the edge, while the next one may be very rough or saw-edged. An object of my invention is to provide means for smoothing each of these collars with the utmost speed. With the case of the slightly-roughened collar its edge is inserted into one of the grooves around the base or largest portion of the head, the circular inner wall of which moves with greater speed and also simultaneously acts on a greater extent of edge than the walls of grooves having less radii, and the smoothing is therefore rapidly accomplished; but in case the edge of the cuff or collar is rougher it will first be inserted into one of the grooves nearer the top of the conical head, and the curvature of the walls of which is sharper and therefore acts upon a less extent of the edge at any one time and the more readily bends down the projections and either partially or wholly smoothes the edge. In order to make the edge perfectly true, it may be finally inserted into the groove having the greatest radius and the work be thereby finished.

It is an object of my invention to provide plenty of room at the machine to enable two persons to smooth collars or cuffs at the same machine at the same time without interfering with each other in the work, and this I accomplish by the machine herein set forth, in which the head is wholly supported from below the table, and the machinery for rotating the head and the appliance for heating the head are also located wholly beneath the surface of the table.

By my invention I am able to avoid all obstructions which will interfere with the workman, and since the said head is provided with series of steps and terminates at the top in the button with the small neck two operators, one on each side of the table, can without interfering with each other simultaneously use the same head for smoothing cuffs or collars. The operatives will use the spindle or neck alternately. One will use the lower grooves at the same time that the other one uses the spindle, and vice versa.

The accompanying drawings illustrate my invention.

Figure 2:
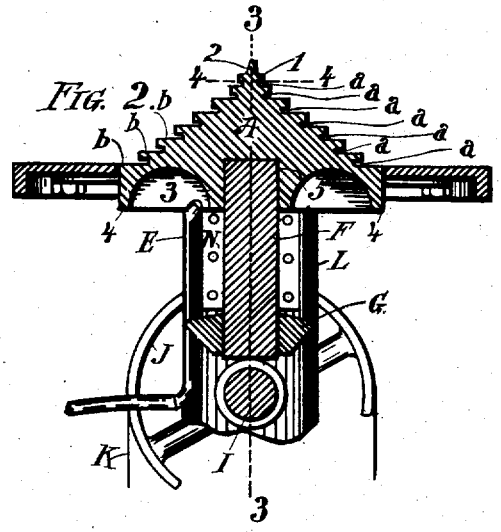
Figure 3:
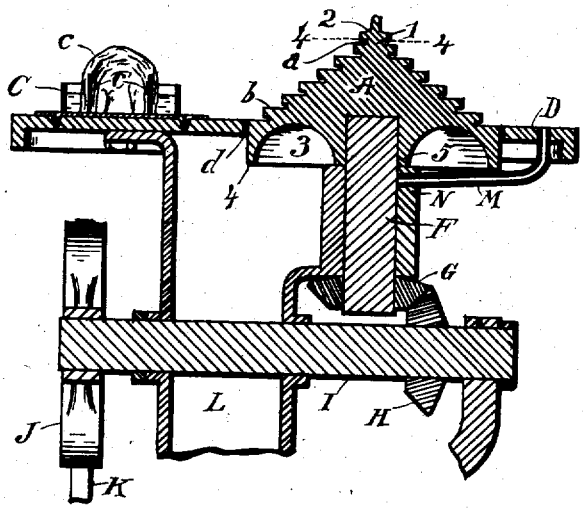
Figure 4:
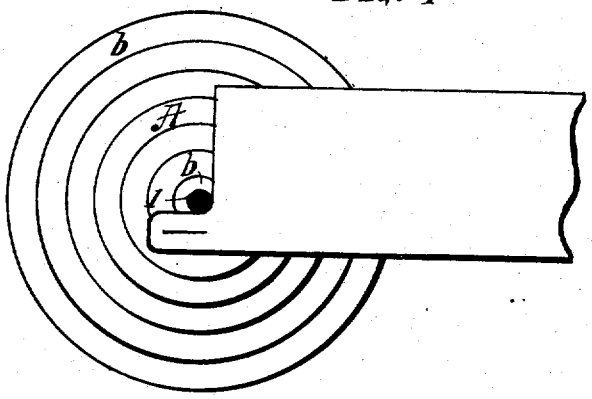

Figure 1 is a perspective view of my invention ready for operation. Fig. 2 is a fragmental vertical mid-section of the same on line 2 2, Fig. 1, looking to the left. Fig. 3 is a fragmental vertical section on line 3 3, Fig. 2. Fig. 4 is a fragmental plan showing the mode of smoothing the internal angle of a collar. The spindle 1 is sectioned on line 4 4, Figs. 2 and 3.

A indicates the revolving head, the upper face of which is stepped and provided with grooves *a*, each lower wall of which is on a line with the next lower step, into which the edge of the cuff or collar may be inserted to be ironed, and having at its top a small neck or spindle 1 for smoothing the internal angles of the collar. D is a smooth table, and the lower step of the head is flush therewith. The head terminates at the top in a pointed button 2 above the spindle 1. The head A is solid and cone-shaped and is stepped, and each step is provided with a groove *a* above it. The lower wall *b* of each groove projects to form a stop, rest, and guide for the cuff or collar to be smoothed, so that in practice the operator will be able to instantly insert the edge of the cuff or collar into the groove by only two movements of the hand—viz., first, a downward movement to bring the cuff or collar onto one of the ledges of the head, and then a horizontal movement to push the edge of the cuff or collar into the groove pertaining to such ledge. When the edge has thus been inserted into the groove, the operator will rapidly draw it back and forth along the groove and against the revolving curved inner wall thereof, thus to perfectly smooth the edge.

*c* indicates a moistener which is attached to the top of the table D in position to be easily reached by the operator, who before inserting the edge of the cuff or collar into the groove will draw such edge along the moistening-pad *c*, thus to moisten the edge immediately before ironing the same. The moistener consists of a cup (marked C) with one or more cones of cheese-cloth fastened on pins *c'*, which project up from the bottom of the cup C.

3 indicates an annular groove in the under face of the revolving head, and into this groove the gas-burner E is arranged to direct its flame. The head A is mounted on top of a revolving shaft F, driven by a beveled wheel G, which in turn is driven by a beveled wheel H, mounted on a horizontal axle I, having a pulley J, driven by a belt K.

L indicates the standard which supports the table, the revolving head, and the driving mechanism.

The table D is provided with a circular hole *d*, in which the lowest and largest step of the table fits flush therewith and revolves. From the under side of the head an annular collar 4 depends to form the outer wall of the groove 3 and confine the flame from the gas-burner E to cause the same to heat the head. The head is provided in its under side with a central socket 5, which fits upon the top of shaft F, so that the head can be removed from and replaced upon the shaft. The head fits tight enough upon the shaft so that thereby, in conjunction with the pinions, the shaft is held from slipping down M indicates an oil-tube leading from the face of the table to the boxing N of the shaft F to oil the bearing.

The small button or knob 2 at the top of the head is not in the way of the operators and serves to hold the edges of the cuff or collar in position against the spindle 1 during the operation of smoothing the internal angle of the collar.

Having thus described my invention, the following is what I claim as new therein and desire to secure by Letters Patent:

1. An ironing-machine comprising a rotatable head formed with a peripheral groove, one wall of the groove being extended beyond the other wall to provide a ledge whereby an article is guided into the groove; substantially as described.

2. An ironing-machine having a rotatable head, a circular groove in the head and a guide on the same plane as a side of the groove, forming a projecting wall to the latter; substantially as set forth.

3. An ironing-machine having a circular rotatable head with circular faces of different circumference, a groove in the circular face of smallest circumference; the surface of the head which extends on a line with the lower wall of the groove forming a guide leading to the groove, substantially as set forth.

4. In a machine of substantially the character described, a rotating portion formed with a groove in which to smooth the edges of articles; the periphery of one wall of which groove is of greater diameter than that of the other wall, whereby a ledge is provided upon which to rest the article and by which to direct it into the groove, substantially as set forth.

5. An ironing-machine having a circular rotatable head with circular faces of different circumference, a groove in the circular face of smallest circumference, a table having a central circular opening, the wall of said opening fitting the face of greatest circumference and in line with the groove therein and means for heating and rotating the head, substantially as set forth.

6. In an ironing-machine, the combination of a rotating circular head formed with a peripheral groove having a guiding-ledge projecting beyond and leading to the groove, said head terminating in an upwardly-presented working end or button with unobstructed working space above it, and means for supporting and operating the head located wholly beneath it; substantially as set forth.

7. The ironing-machine consisting of the table provided with a circular hole, the shaft journaled coaxially with such hole; a circular head fixed on the upper end of the shaft and fitted in the hole and provided with a peripheral groove one wall of which is in line with the face of the table and terminating in a knob at the top with a groove around the neck of the knob; means underneath the table and head for heating the head; and means for rotating the shaft, substantially as set forth.

8. The combination of a vertical rotating shaft; means for rotating the shaft; a circular head on such shaft stepped on its upper face and having around the steps respectively a peripheral groove, substantially as set forth.

9. The combination of a vertical rotating shaft; means for rotating the shaft; a circular head fixed on the top of such shaft and being solid and stepped on its upper face and having around the steps respectively a peripheral groove; and the heating appliance arranged beneath the head to heat it.

10. In an ironing-machine for smoothing the edges of cuffs and collars, a conical revolving head having its surface stepped to form vertical circular walls and horizontal annular ledges, and provided with peripheral grooves formed respectively in the vertical walls, each of which grooves has one of its walls in line with and adjacent to an annular ledge; substantially as shown and for the purposes set forth.

11. In a machine for ironing the edges of collars, a circular rotary head having its upper face stepped and provided with peripheral grooves and terminating at the top in a button or knob having a small neck to approximately fit into the internal angles of the collar, substantially as and for the purpose set forth.

12. The machine for smoothing the edges of cuffs and collars provided with a vertical rotating shaft and a gas-burner arranged near such shaft; and a solid circular head having its upper face stepped and provided with peripheral grooves and in its under side a central socket to fit the upper end of the shaft, and an annular groove to receive the flame from the gas-burner.

FRED E. FAY.

Witnesses:
J. W. KEMP,
J. E. KNIGHT.